Feb. 13, 1968  L. CARDWELL  3,368,698

HYDRAULIC DRAFT GEAR WITH CONSTANT FORCE DEVICE

Filed Jan. 12, 1966  3 Sheets-Sheet 1

Inventor
Lloyd Cardwell.
By
Mann, Brown & McWilliams,
Attys.

Feb. 13, 1968 L. CARDWELL 3,368,698
HYDRAULIC DRAFT GEAR WITH CONSTANT FORCE DEVICE
Filed Jan. 12, 1966 3 Sheets-Sheet 2

Inventor
Lloyd Cardwell
By Mann, Brown & McWilliams
Attys.

Feb. 13, 1968     L. CARDWELL     3,368,698
HYDRAULIC DRAFT GEAR WITH CONSTANT FORCE DEVICE
Filed Jan. 12, 1966     3 Sheets-Sheet 3
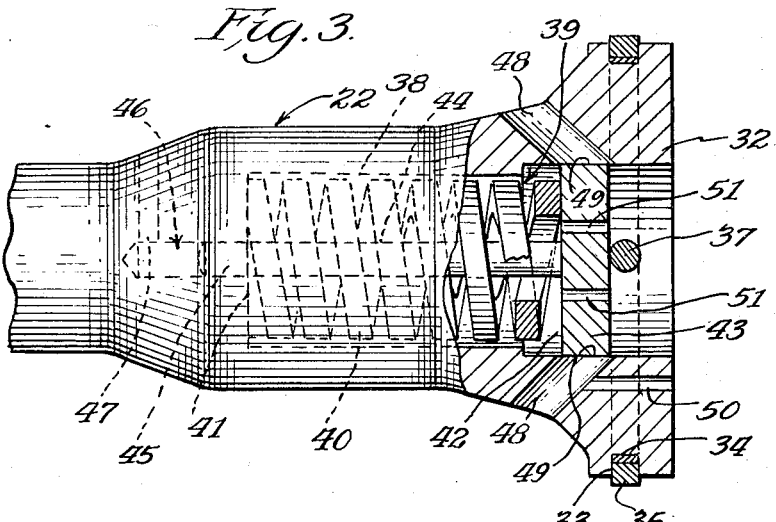
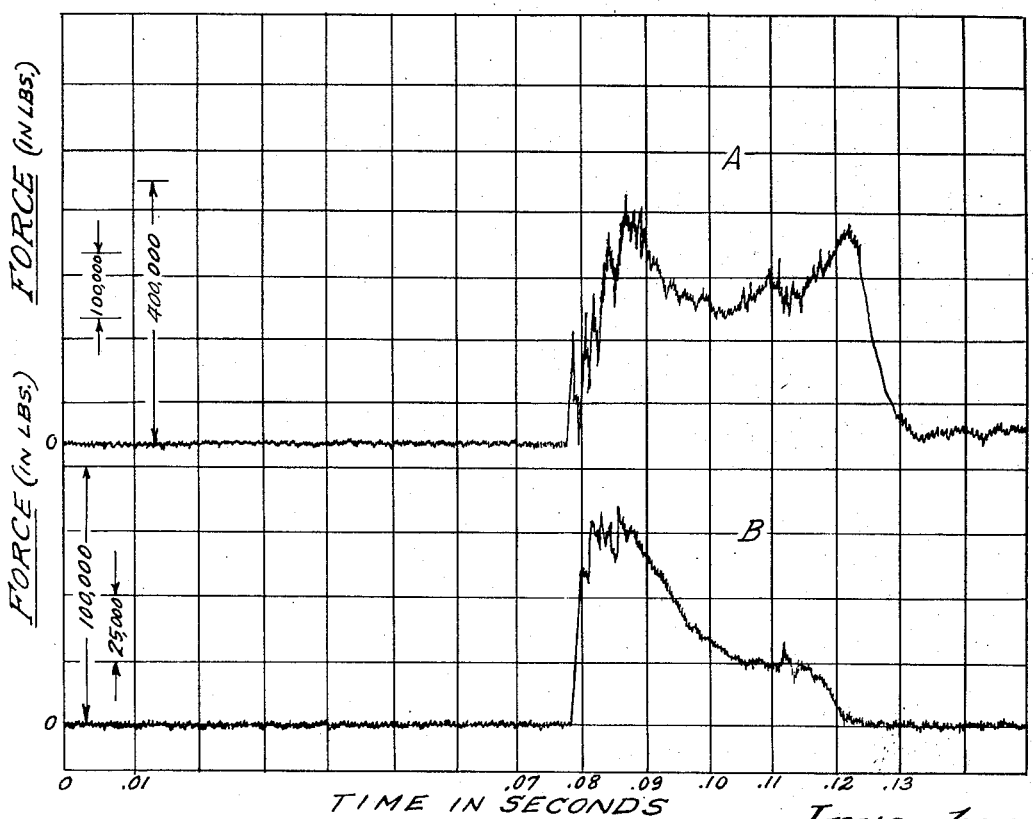
Inventor
Lloyd Cardwell.
By Mann, Brown & McWilliams
Attys.

United States Patent Office 3,368,698
Patented Feb. 13, 1968

3,368,698
HYDRAULIC DRAFT GEAR WITH CONSTANT FORCE DEVICE
Lloyd Cardwell, Chicago, Ill., assignor to Cardwell Westinghouse Company, a corporation of Delaware
Filed Jan. 12, 1966, Ser. No. 520,208
9 Claims. (Cl. 213—43)

ABSTRACT OF THE DISCLOSURE

A hydraulic draft gear for use on railroad cars in which the pressures exerted on the draft gear during impact are levelled out and wide variations in pressure during slipping and gripping of the friction clutch are avoided by providing a second piston within the main piston, the second piston controlling ports connecting the high pressure side of the main cylinder with the low pressure side, the ports being of circular or other shape so that they gradually decrease in cross-sectional arrangement in the direction of closure thereof by the second piston. The second piston is spring biased toward closed position and the biasing spring is so related to the maximum pressure for which the device is designed that the second piston opens the orifice to a position representing the maximum rate of increase of area when maximum pressure is exerted on the draft gear. As a result, when the pressure on the gear is released the orifice close at a gradually decreasing rate and therefore tends to even out the variations in pressure.

---

This invention relates to hydraulic cushioning or shock absorber devices and is more particularly concerned with hydraulic cushioning devices useful as part of draft gears for railroad cars when used in conjunction with spring cushioning elements and friction clutch elements.

In Campbell et al. 3,150,782 there is disclosed and shown draft gears for railroad cars involving the combination of friction clutch elements, spring cushioning elements, and hydraulic cushioning elements. In the modifications shown in FIGURES 11, 13 and 15, means are provided to obtain more uniform closure characteristics for a composite gear arrangement by providing a spring-loaded slidable pin in the piston element of the hydraulic unit to control the opening and closing of an orifice.

The present invention is an improved form of control device to level out the pressures exerted on the combined gear during impact and to avoid the variations in pressure which occur during slipping and gripping of the friction clutch.

I have discovered that the closure characteristics of the composite gear can be improved by modifying the piston orifice and the pin element by which the orifice is controlled.

One of the objects of the invention is to provide an improved hydraulic cushioning or shock absorber device.

Another object of the invention is to provide an improved hydraulic unit for a combined friction clutch, coil spring and hydraulic draft gear.

A still further object of the invention is to provide an improved draft gear for railroad cars.

Still another object of the invention is to improve the characteristics of the hydraulic unit forming part of a combined friction clutch, coil spring and hydraulic cushioning draft gear.

Other objects of the invention will manifest themselves from the following description and the accompanying drawings of which:

FIG. 3 is a partial longitudinal axial cross-section of the piston shown in FIG. 2 in a plane at an angle of 90° from the plane of FIG. 2;

FIG. 5 is an oscillograph resulting from a hammer test of a draft gear constructed similarly to FIG. 11 of Campbell Patent 3,150,782.

Figure 1:
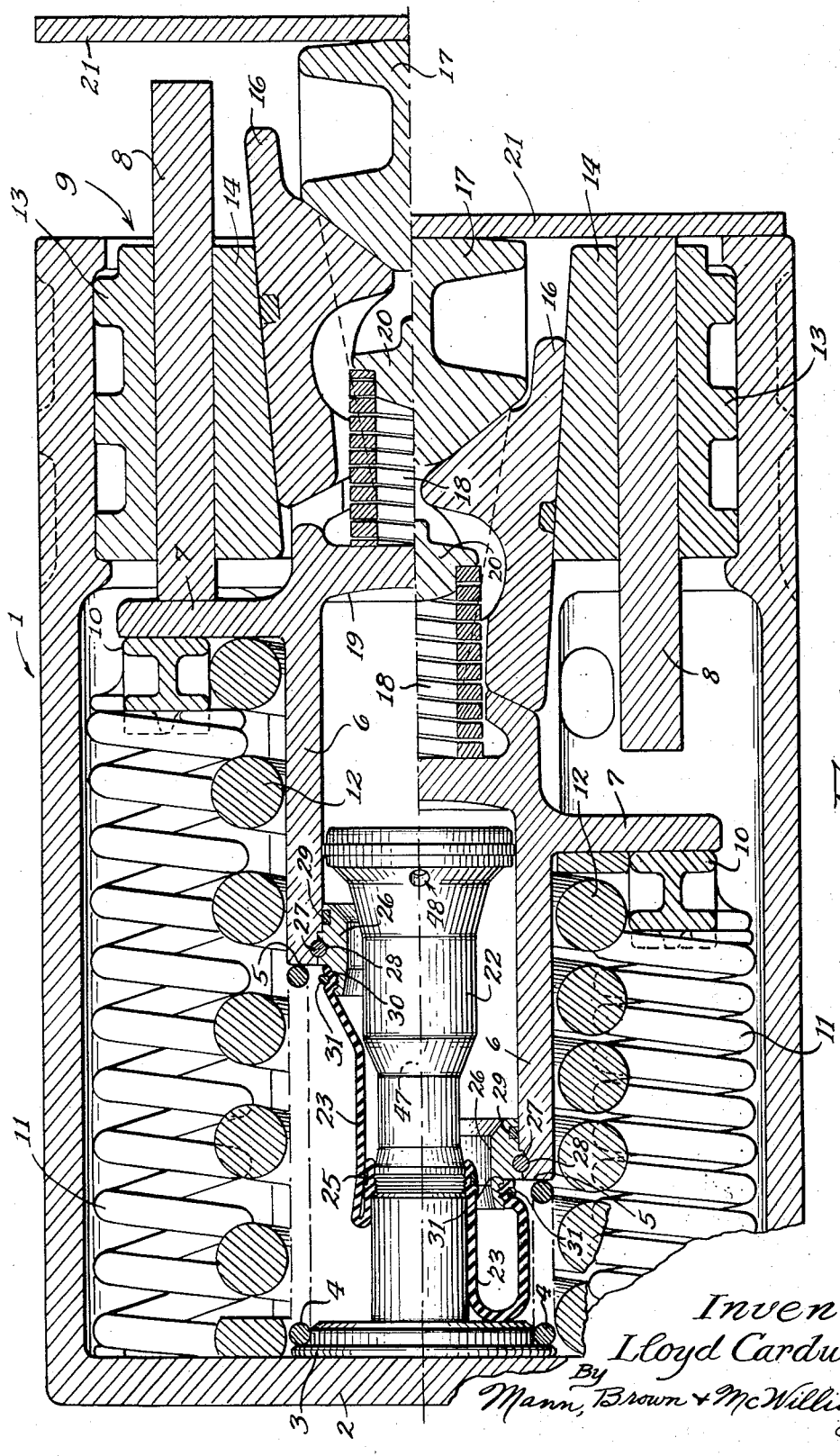
FIG. 1 is a split sectional view of a draft gear incorporating the invention, the upper portion showing the gear in release position and the lower half showing the gear in fully compressed position.

Referring to the drawing, and particularly FIGURE 1, numeral 1 represents an elongated housing structure with an integrally formed rear wall 2. Spring seat 3 is mounted on the inside of a wall 2 and against which one end of coil spring 4 abuts. The other end of coil spring 4 abuts againts spring seat 5 and is held in compression between the two seats.

Spring seat 5 is formed on the end of the cylinder 6. The front end of the cylinder 6 is formed with a wall 7 against which the movable plates 8 of the friction assembly 9 are adapted to abut. Auxiliary spring seats 10 are provided for the corner coil springs 11. The main coil spring cushioning element 12 is held in compression between the rear wall 2 and the wall 7.

The friction clutch assembly 9 consists of the outer stationary plates 13, the inner tapered stationary plates 14, the movable plates 8 intermediate the stationary plates 13 and 14, the wedge shoes 16, and the center wedge 17. Release coil spring 18 is provided between wall 19 and spring seat 20, forming part of the center wedge 17. Element 21 is a movable follower for the gear.

Mounted within cylinder 6 is piston 22. A flexible boot 23 has one end fastened to the piston by means of a band ring 25 and the other end is fastened to a cylinder cap and boot adapter 26, inserted in the end of cylinder 6, and held in place by means of a roll pin 27 inserted through a bore in the cylinder wall and an annular groove 28 encircling the outer wall of the insert 26 intermediate the end thereof and aligned with the cylinder bore. A rubber gasket 29 is held in an annular groove in the sealing cap and adapter 26, and seals the space between the adapter and the cylinder against leakage. The end 30 of the boot is fastened to the adapter 26 by means of bead ring 31.

Except for the specific means for holding the cylinder cap and boot adapter within the cylinder end, the apparatus so far described is substantially identical with that shown in FIGURES 1 and all of the Campbell et al. Patent 3,150,782.

Figure 2:
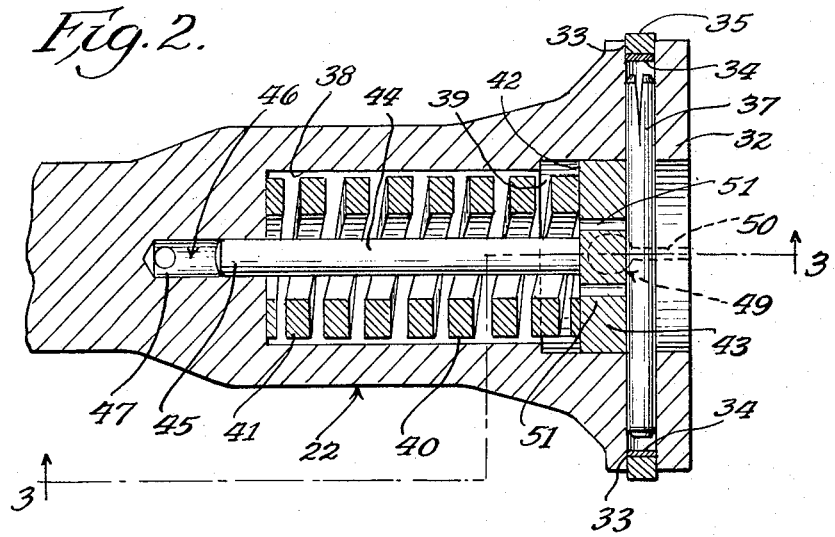
FIG. 2 is a partial longitudinal axial cross-section of a piston forming part of the hydraulic cushioning device.

Referring more particularly to FIGURES 2 and 3, piston 22 is formed with a head 32 of substantially the same diameter as the cylinder 6. The piston head is formed with an annular groove 33 in which is mounted an expansion ring 34 and piston ring 35. A bore 36 passes diametrically through the piston head in the same plane as groove 33 and receives a pin 37 which extends through the piston with its ends adjacent the expansion ring 34. The purpose of the pin will be hereinafter explained.

The piston 22 has an axial bore or chamber 38 connecting with an axial counterbore 39. Compression coil spring 40 is located in chamber 38. One end of the coil spring seats against the rear wall 41 of the chamber 38 and the other end of the coil spring seats against the inner face 42 of a variable orifice control piston 43. Piston 43 is adapted to slide in bore 39. It is not necessary to provide for leakage between the bore and piston wall. Spring 40 is adapted to bias piston 43 outwardly against pin 37. Pin 37 functions to limit the outward stroke of piston 43.

Attached to the inner face 43 of piston 42 is a stem 44, the other end 45 of which is adapted to slide in cylinder guide 46. The guide space 46 is connected by a small bore 47 to the space outside the piston 22 between the piston and boot 23 in order to relieve pressure in guide space 46 below the end 45 of stem 44.

As more clearly shown in FIG. 3, piston head 32 is formed with passages 48 bored obliquely through the side walls of the piston connecting the high pressure side of cylinder 6 with the low pressure side of the cylinder and piston. The passages 48 are preferably two in number, spaced diametrically opposite each other, but more than two passages may be used. Passages 48 are provided with orifices 49 aligned so that when the orifice control piston 43 is in its outermost or release position, the orifices are almost, but not quite, completely closed. A slight opening is left in order to permit release of any residual pressure on the piston 22 due to pressure in the low pressure side of the cylinder and permit the piston to return quickly to its full release position. To further insure rapid return of the piston 43 to its full release position, a restricted bore 50 is provided from the face of the piston head 32 to one of the passages 48. Four equally spaced small bores 51 are provided through the orifice control piston 43 in order to equalize pressure on both sides of the piston.

Operation of the draft gear is similar to the operation of the draft gear described in FIG. 11 of the Campbell et al. Patent 3,150,782 but has improved characteristics due to the relationship between the piston 43 and the orifices 49. The orifices 49 and the piston 43 are so arranged that at the maximum pressure or impact which the draft gear is designed for, piston 43 will be depressed to open the orifices approximately one-half. The orifices are preferably circular in shape so that during the release or closure stroke of piston 43 the orifices 49 will close faster at the beginning of the closure stroke of the piston than toward the end of the stroke, i.e., a larger area of the orifice is closed per unit movement of the piston 43 at the beginning than at the end of the stroke. This will be evident from the fact that the piston is depressed during impact to a line defining the diameter or widest portion of the orifice and during closure each increment of piston movement covers an area of the hemi-spherical opening which is less than the area covered by the preceding increment. I prefer to use orifices of circular shape because such orifices can readily be machined through the piston wall. However, any other shape orifice such as oval or triangular which will provide faster closure at the beginning of the release stroke than at the end of the stroke can be used.

Upon impact, pressure is transmitted to piston 43. The bores 51 through the piston permit hydraulic fluid to flow freely into the chamber 38, equalizing pressure on both sides of the piston. However, because of the difference in area between the inner and outer faces of the piston, due to the stem 44, the total force exerted on the outer face is greater than that exerted against the inner face and consequently piston 43 is forced inwardly against the resistance of spring 40, thereby exposing orifices 49 and permitting fluid to pass from the high pressure side of the cylinder into the low pressure side of the piston and cylinder. It will be apparent that the larger the diameter of stem 44 the greater will be the difference in pressure on the two sides of piston 43 resulting in more compression of spring 40 and a larger opening of orifices 49. Therefore, since the orifice area is closing more rapidly during initial portion of the closure stroke of piston 43, the pressure in the high pressure side of the cylinder will tend to be maintained at a higher level than would be the case if the orifice closed at a uniform rate. The pressure on spring 40 also determines the extent to which the orifices 49 will open. As previously stated, the ratio of the inner and outer faces of piston 43 and the force exerted by spring 40 are so related as to cause the orifices to open approximately half way at maximum impact for which the draft gear is designed.

The pressure in the high pressure side of the cylinder is highest at the instant of impact of the cars. As the velocity of the striking car decreases, the pressure in the hydraulic cylinder decreases, causing piston 43 to move outward and close the orifices 49. Whereas in the structure shown in Campbell et al. Patent 3,150,782, the orifice pin 400 closes the orifice at a rate directly proportional to the decrease in pressure exerted by spring 401, in the device of this invention the orifice closes at a rate faster than the rate of decrease in pressure exerted by spring 40. Because the area of the orifice is reduced faster than the pressure in the cylinder, the unit tends to balance itself by adjusting to variations in pressure. The variable orifices automatically increase in area when the pressure increases and reduces in area when the pressure is reduced.

In a friction type draft gear the pressure varies during closure in accordance with the slippage and seizure of the friction plates. This change in pressure causes a corresponding change in the deceleration of the mass striking the gear. The change in the deceleration in closure of the gear causes a corresponding change in the pressure of the hydraulic fluid on the high pressure side of the hydraulic device. This, in turn, causes corresponding change in the orifice opening since the opening is pressure sensitive and is controlled by the pressure on the high pressure side of piston 43. As a result, when the force exerted on the draft gear drops, the pressure in the hydraulic unit increases which tends to restrict wide variation in pressure common to a conventional friction draft gear. This phenomenon is illustrated in FIGS. 4A and 4B, at points 1, 2, 3 and 4. The oscillographs in FIGURES 4A and 4B were made simultaneously. The oscillograph from points 1 to 3 represents a drop in force on the entire draft gear. At precisely the same time, the pressure on the hydraulic unit increased from point 2 to point 4.

In actual practice, spring 40 and piston 32 are designed to open the orifices 49 to the half way point when a pressure of about 12,000 pounds p.s.i. is exerted on the piston 43.

The draft gear shown in FIG. 1 is scaled somewhat smaller than actual size, but FIGURES 2 and 3 are substantially full scale drawings. In this particular unit the main piston head 32 has a diameter of 3¼″, the piston 43 has a diameter of about 1⅜″, the guide pin 44 has a diameter of approximately 9/32″, the bores 51 have a diameter of approximately 3/32″ and each of the two orifices 49 are approximately 5/16″ in diameter. The spring 40 exerts a force against the innerface 42 of piston 43 of approximately 236 pounds in full release position and a force of 295 pounds when the piston 43 is in a position so that orifices 49 are half open.

It will be understood of course that these relationships will vary with different size equipment and equipment designed for greater or smaller loads.

Figure 4:
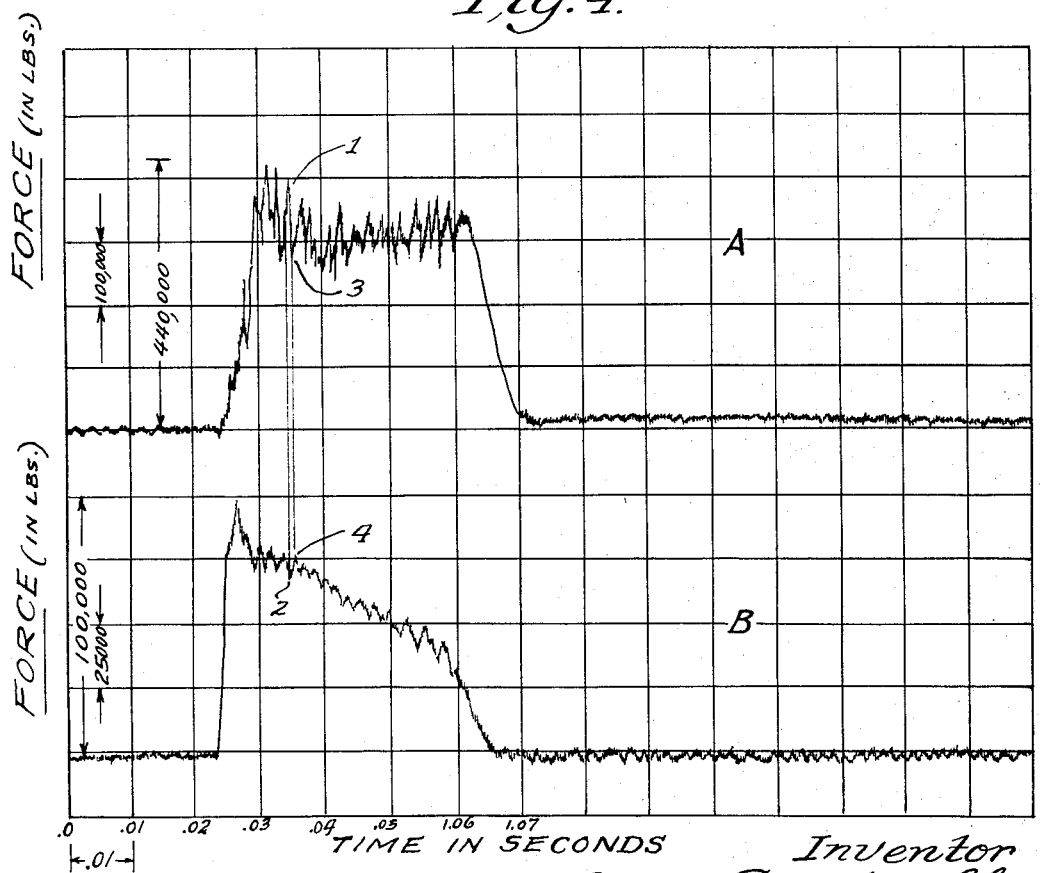
FIG. 4 is an oscillograph resulting from a hammer test made on a device constructed in accordance with this invention.

FIGURES 4 and 5 illustrate the difference between the characteristics of a draft gear incorporating the invention herein disclosed and claimed as compared with a draft gear using the Campbell Patent 3,150,782.

FIGURE 4 is an oscillograph in which force in pounds is recorded against time in seconds. The oscillographs were obtained by dropping a 27,000 pound hammer on the draft gear and recording the force of the impact on the entire draft gear and on the hydraulic unit only. The oscillograph shown in FIG. 4A shows the force of the impact of the entire gear, whereas oscillograph 4B shows the force on the hydraulic unit only. As compared to FIG. 5, it will be seen that the total force level on the gear during impact is substantially flat, and the force on the hydraulic unit decreases along a slightly convex line; whereas with the Campbell patent, the oscillograph (FIG. 5A) taken on the entire unit is bellied or concaved, as was true also of the oscillograph (FIG. 5B) on the hydraulic unit alone.

FIGURE 4A represents a more desirable performance, since it is more nearly rectangular and therefore, represents a larger amount of work done at the lowest reaction force level. The lower the reaction force level, the less the damage to the cars and the lading.

It will be seen that by means of this invention it is possible to even out peaks and valleys in the forces or impacts to which freight cars are subjected during impact and other operations, and therefore, mitigate the likelihood of damage to both goods and equipment.

I claim:

1. In an hydraulic device having a cylinder with a low and high pressure side divided by a first piston slidably mounted therein in substantially liquid leak-proof relationship, spring means biasing said device to a non-compressed state, a chamber in said first piston, liquid passage means extending through the walls of said first piston and connecting the high pressure side of said cylinder with the low pressure side thereof, the improvement which comprises
    (a) a second piston slidably mounted in said first piston and spring biased toward the high pressure side of said cylinder,
    (b) at least one passageway through said second piston, connecting said chamber to the high pressure side of said cylinder,
    (c) the area of the face of said second piston exposed to the high pressure side of said cylinder being greater than the area of the opposite face of said second piston,
    (d) said second piston being mounted to control the area of opening of said liquid passage means in accordance with pressure exerted on said second piston by liquid in the high pressure side of said cylinder and the force exerted by the biasing spring for said second piston,
    (e) said passages having orifices opening to the high pressure side of said sylinder which are of circular configuration,
    (f) the biasing force of the second spring exerted on the piston, and areas of the face of the second piston exposed to the high pressure side of said cylinder and the opposite face thereof being so related as to cause the second piston to move a distance which will open said orifices substantiallly half way when said device is subjected to maximum design pressure.

2. An hydraulic device in accordance with claim 1 in which said opposite face of the second piston is attached to a guide pin.

3. An hydraulic device in accordance with claim 1 including a pin inserted through the head of the first mentioned piston across the path of travel of said second piston to limit the stroke thereof in the direction in which it is spring-biased.

4. An hydraulic device in accordance with claim 3 in which said liquid passages extend obliquely through the walls of the first piston.

5. An hydraulic device in accordance with claim 3 including a bore of restricted cross-section as compared to said passages through said first piston, connecting at least one of said passages, intermediate its ends, with the high pressure side of said cylinder.

6. An hydraulic device in accordance with claim 1 including means for limiting the travel of said second piston in the direction in which it is spring-biased so that motion of said second piston ends in a position to leave said orifices slightly open.

7. In a draft gear comprising lengthwise extending housing structure having a stationary follower at one end, a movable follower adjacent the other end of said housing structure and reciprocably movable in a lengthwise direction relative thereto, means for transmitting force between said followers, said means including a hydraulic cushioning element and a friction clutch element in lengthwise successive relation in said housing structure, said friction clutch having means in lengthwise slidable friction engagement against said housing structure to act simultaneously with said hydraulic cushioning element during closure of the gear, and means for restoring said friction clutch and said hydraulic cushioning element to release the gear, said hydraulic cushioning element including a cylinder, a piston slidable lengthwise in the cylinder to define a high pressure chamber and a low pressure chamber on opposite sides of the piston, liquid passage means extending through said piston to establish communication between said chambers, said liquid passage means having flow restricting orifices at one end exposed directly to said high pressure chamber, the improvement which comprises:
    (a) a chamber in said piston,
    (b) a second piston slidably mounted in said first mentioned piston and spring biased toward said high pressure chamber,
    (c) at least one passageway through said second piston connecting the piston chamber to said high pressure chamber,
    (d) the area of the face of said second piston exposed to the high pressure chamber being greater than the area of the opposite face thereof,
    (e) said second piston being mounted to control the area of opening of said orifices in accordance with pressure exerted on said second piston by liquid in the high pressure chamber and the force exerted by the biasing spring,
    (f) said orifices decreasing in cross-sectional area in the direction of movement of said second piston toward orifice closure,
    (g) the relationship between the biasing force exerted by the spring on said second piston and areas of the opposite faces of said second piston being such as to cause said second piston to move to a position representing substantially the maximum rate of increase in area of said orifices, when the hydraulic cushioning element is subjected to its maximum designed pressure.

8. A draft gear in accordance with claim 7 in which said orifices are of substantially circular cross-section.

9. A draft gear in accordance with claim 7 including means for limiting the travel of said second piston in the direction in which it is spring-biased so that motion of said second piston ends in a position to leave said orifices slightly open.

References Cited

UNITED STATES PATENTS

| 2,816,670 | 12/1957 | Edwards et al. | 213—43 |
| 3,150,782 | 9/1964 | Campbell et al. | 213—43 |

ARTHUR L. LA POINT, *Primary Examiner.*

DRAYTON E. HOFFMAN, *Examiner.*

PO-1050
(5/69)

UNITED STATES PATENT OFFICE
CERTIFICATE OF CORRECTION

Patent No. 3,368,698        Dated February 13, 1968

Inventor(s) Lloyd Cardwell

It is certified that error appears in the above-identified patent and that said Letters Patent are hereby corrected as shown below:

Column 5, line 21, between "in" and "said" insert -- the chamber of --; same column, line 23, between "cylinder" and the comma insert -- by a spring --; same column, line 37, for "passages" read -- liquid passage means --; same column, line 38, for "sylinder" read -- cylinder --; same column, line 56, for "passages" read -- passage means --; same column, line 60, for "passages" read -- liquid passage means --; same column, line 61, for "passages" read -- liquid passage means --.

Column 6, line 26, between "in" and "said" insert -- the chamber of --; same column, line 28, between "chamber" and the comma insert -- by a spring --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents